United States Patent
Ding et al.

(10) Patent No.: US 9,208,808 B1
(45) Date of Patent: Dec. 8, 2015

(54) ELECTRONIC SYSTEM WITH UNLOAD MANAGEMENT MECHANISM AND METHOD OF OPERATION THEREOF

(71) Applicant: Western Digital Technologies, Inc., Irvine, CA (US)

(72) Inventors: Jianghong Ding, Ladera Ranch, CA (US); Jenghung Chen, Cupertino, CA (US); Wenli Yang, Los Angeles, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/305,923

(22) Filed: Jun. 16, 2014

Related U.S. Application Data

(60) Provisional application No. 61/982,451, filed on Apr. 22, 2014.

(51) Int. Cl.
G11B 5/55 (2006.01)
G11B 5/54 (2006.01)

(52) U.S. Cl.
CPC ............... *G11B 5/5547* (2013.01); *G11B 5/54* (2013.01)

(58) Field of Classification Search
None
See application file for complete search history.

(56) References Cited

U.S. PATENT DOCUMENTS

| | | |
|---|---|---|
| 5,307,489 A | 4/1994 | Yamazaki |
| 5,491,816 A | 2/1996 | Matoba et al. |
| 5,615,368 A | 3/1997 | Terashima et al. |
| 5,826,003 A | 10/1998 | Matoba et al. |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,140,784 A * | 10/2000 | Mazda .......................... 360/75 |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |

(Continued)

*Primary Examiner* — Wayne Young
*Assistant Examiner* — James L Habermehl

(57) ABSTRACT

An apparatus includes: a media; a head assembly over the media; a head actuation motor coupled to the head assembly; control circuitry, coupled to the head actuation motor, configured to position the head assembly; and a head loading ramp, adjacent to the media; wherein: the control circuitry is further configured to: generate a seek count; and park the head assembly, off of the media, on the head loading ramp, controlling a speed of the head actuation motor based on the seek count.

24 Claims, 3 Drawing Sheets

(56) References Cited

U.S. PATENT DOCUMENTS

| | | |
|---|---|---|
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,319 B1 * | 12/2002 | Kusumoto et al. ............ 360/75 |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,661,598 B2 * | 12/2003 | Kusumoto et al. ............ 360/75 |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,754,024 B2 | 6/2004 | Suk et al. |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,922,302 B2 * | 7/2005 | Kusumoto et al. ............ 360/75 |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,271,976 B2 | 9/2007 | Ishii et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |

(56) References Cited

U.S. PATENT DOCUMENTS

| | | |
|---|---|---|
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,787,211 B2 * | 8/2010 | Kim et al. .................. 360/78.06 |
| 7,800,853 B1 | 9/2010 | Guo et al. |
| 7,800,856 B1 | 9/2010 | Bennett et al. |
| 7,800,857 B1 | 9/2010 | Calaway et al. |
| 7,817,370 B2 | 10/2010 | Cromer et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,245,064 B2 * | 8/2012 | Fulkerson et al. ............ 713/323 |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,478 B1 | 7/2014 | Huynh et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2002/0196574 A1 | 12/2002 | Suk et al. |
| 2006/0092549 A1 | 5/2006 | Ishii et al. |
| 2008/0239545 A1 | 10/2008 | Cromer et al. |

(56) References Cited

U.S. PATENT DOCUMENTS

| | | |
|---|---|---|
| 2009/0237825 A1* | 9/2009 | Sato et al. ................. 360/39 |
| 2010/0035085 A1 | 2/2010 | Jung et al. |
| 2010/0134912 A1 | 6/2010 | Koester |
| 2012/0281311 A1* | 11/2012 | Ishihara et al. ............ 360/78.06 |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

ELECTRONIC SYSTEM WITH UNLOAD MANAGEMENT MECHANISM AND METHOD OF OPERATION THEREOF

CROSS-REFERENCE TO RELATED APPLICATION

This application claims the benefit of U.S. Provisional Patent Application Ser. No. 61/982,451 filed Apr. 22, 2014, and the subject matter thereof is incorporated herein by reference thereto.

TECHNICAL FIELD

An embodiment relates generally to an electronic system, and more particularly to a system for managing a premature unload indication.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Increased capacity and cost reductions are an ongoing market demand for storage in these systems.

In the working environment, heavy usage of the storage devices can establish wear patterns that weaken the ability of the storage device to properly park the head actuation mechanism. The weakening of the ability to properly park the head actuation mechanism can cause the slider to remain in contact with the media through a power down. If the storage device has power removed while the heads remain engaged with the media, several permanent failure modes can occur. Examples of these failures can include the media motor fails to turn due to insufficient torque, permanent material transfer between the media and the slider, or tearing the slider off of the actuator mechanism. Any of these failures will destroy the ability of the storage device to function properly.

DETAILED DESCRIPTION

Figure 1A:
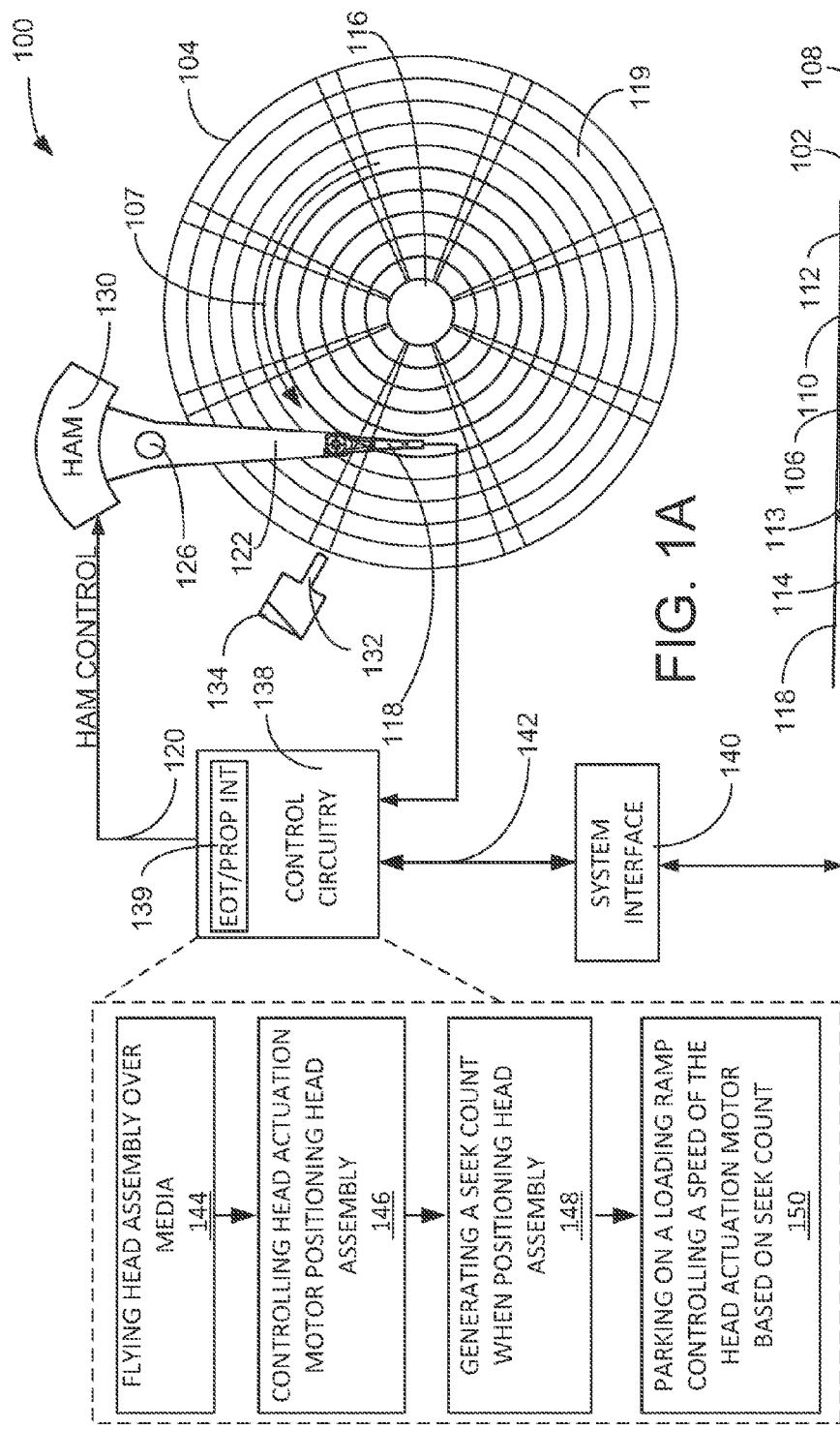
FIGS. 1A, 1B, and 1C show an operational diagram of an electronic system according to an embodiment.

A need still remains for an electronic system with unload management mechanism for reliably unloading the heads from the media after extended operation periods. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use various embodiments. It is to be understood that other embodiments would be evident based on the present disclosure, and that system, process, or mechanical changes may be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the various embodiments can be operated in any orientation. The embodiments have been numbered first embodiment, second embodiment, etc. as a matter of descriptive convenience and are not intended to have any other significance or provide limitations for an embodiment.

The term "module" referred to herein can include software, hardware, or a combination thereof in an embodiment in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1B:
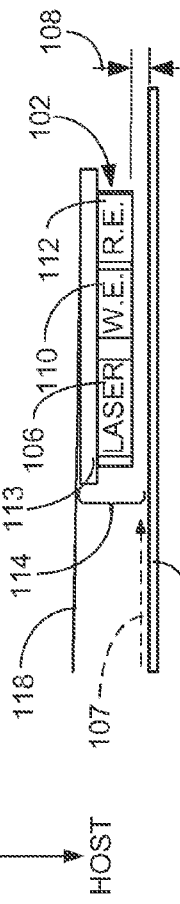
Figure 1C:
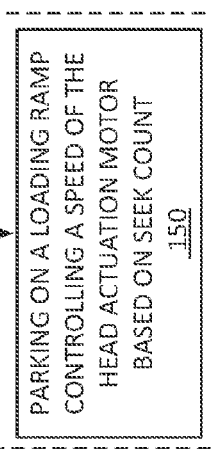

Referring now to FIGS. 1A, 1B, and 1C, therein are shown an operational diagram of an electronic system 100 according to an embodiment. The electronic system 100 can represent an apparatus for one of the embodiments. An embodiment depicted in FIGS. 1A, 1B, and 1C is shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

The electronic system 100 including a head 102 actuated over a media 104. The head 102 can be mounted to a flex arm 118 attached to an actuator arm 122. The head 102 (shown in FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element). A fine positioner 113, such as a micro-actuator, a milli-actuator, a piezo-electric transducer, a bi-metal deflector, or a pressure deflector, can reside between the flex arm 118 and the head 102. A head assembly 114 can be the combination the fine positioner 113 and the head 102.

The fine positioner 113 can extend the position of the head 102 plus or minus half the width of a data track 119. In an embodiment the fine positioner 113 can be controlled by control circuitry 138 applying an offset voltage through a head actuation motor (HAM) control bus 120. The amount of displacement of the fine positioner 113 can be controlled by the amount of offset voltage applied. In a neutral position no offset voltage is present in the fine positioner 113. In the event the fine positioner 113 is deflected, for example by contacting a head loading ramp 132 during an unload process of the head assembly 114, the offset voltage caused by the deflection can be detected by the control circuitry 138 through the HAM control bus 120.

The media 104 is a structure for storing information. For example, the media 104 can be made of an aluminum alloy, ceramic/glass, or a similar non-magnetic material. The surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably.

A spindle motor 116 can rotate the media 104, about a center of the media 104, at constant or varying speed 107. For illustrative purposes, the spindle motor 116 is described as a motor for a rotation, although it is understood that the spindle motor 116 can be other actuating motors for a tape drive, as an example.

As examples, a head actuation motor 130 can be a head actuation motor (HAM) assembly, a stepper motor assembly, or a combination thereof. The head actuation motor 130 can generate a torque or force for positioning the head 102.

A tapered end of the flex arm 118 can support the head assembly 114. The flex arm 118 can be mounted to the actuator arm 122, which is pivoted around a pivot bearing assembly 126 by the torque generated by the head actuation motor 130. The head 102 can include a single instance of the write element 110 and a single instance of the read element 112 that is narrower than the write element 110. The head assembly 114 can fly over the media 104 at a dynamically adjustable span of the flying height 108, which represents a vertical displacement between the head 102 and the media 104. The head assembly 114 can be positioned by the flex arm 118 and the actuator arm 122 and can have the flying height 108 adjusted dynamically by the control circuitry 138.

The head assembly 114 can be positioned over the media 104 along an arc shaped path between an inner diameter of the media 104 and outer diameter of the media 104. For illustrative purposes, the actuator arm 122 and the head actuation motor 130 are configured for rotary movement of the head 102. The actuator arm 122 and the head actuation motor 130 can be configured to have a different movement. For example, the actuator arm 122 and the head actuation motor 130 could be configured to have a linear movement resulting in the head 102 traveling along a radius of the media 104.

The head assembly 114 can be positioned over the media 104 to create magnetic transitions or detect magnetic transitions from the coating layer that can be used for representing written data or read data, respectively. The position of the head assembly 114 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be non-volatile random access memory (NVRAM) or Flash memory and a volatile storage can be static random access memory (SRAM) or dynamic random access memory (DRAM).

The control circuitry 138 can also include an EOT and PROP INT mechanism 139 for controlling the end of travel (EOT), such as the positioning of the head assembly 114 against an outer diameter crash stop (ODCS) 134 under power, and proportional integral control coefficients, which manage the torque applied by the HAM 130.

A system interface 140 can couple the control circuitry 138 to a host electronics (not shown). The system interface 140 can transfer user data 142 between the host electronics and the control circuitry 138. The user data 142 can be encoded or decoded by the control circuitry 138 in preparation for transfer to or from the media 104.

The control circuitry 138 can be configured to control the spindle motor 116 for adjusting the speed 107 of the media 104. The control circuitry 138 can be configured to cause the head assembly 114 to move relative to the media 104, or vice versa. The control circuitry 138 can also be configured to control the flow of information to the head 102 for writing to the media 104. The information sent to the head 102 can include the preconditioning pattern, direct current erase signals, user data, or a combination thereof.

During operation of the electronic system 100, the control circuitry 138 manages the movement of the head assembly 114 through the head actuation motor 130. The repetitive motions of the head assembly 114 can create wear patterns in the pivot bearing assembly 126. The wear patterns can result in the formation of a pivot grease bump positioned at the extremities of the repetitive motion. The formation of the pivot grease bump does not impact the normal operation of the electronic system 100, but can cause problems when the control circuitry 138 causes the parking of the flex arm 118, supporting the head assembly 114, on the head loading ramp 132.

A pivot grease bump is one of the major causes of Head-On-Media (HOM) failure for hard disk drives (HDD) in the field, especially for some users that have the HDD turned on for operation for months without interruption. The head-on-media failure occurs when the head actuation motor 130 is brought to a stop by the pivot grease bump without reaching the head loading ramp 132. The catastrophic result can cause the head 102 to land directly on the media 104 and become permanently stuck. The pivot grease bump formed over time and millions of seek operations can generate a resistance that exceeds the design margin of the unload torque developed by the head actuation motor 130.

As shown in the flow diagram of FIG. 1C, an embodiment can include flying a head assembly over a media (block 144), which, upon load initializes a counter when the head 102 is initially loaded from the head loading ramp 132. Block 146 includes controlling a head actuation motor for positioning the head assembly, which can perform the operational duties of the electronic system 100 for storing and retrieving user data 142 on the media 104. Block 148 includes generating a seek count when positioning the head assembly, which can establish a probability that a pivot grease bump has been formed. Block 150 includes parking the head assembly on a head loading ramp, which may include controlling a speed of the head actuation motor based on the seek count 150. This can adjust the speed of the unload process of the head 102 based on the seek count establishing a probability that a pivot grease bump has formed. If the number of seeks is below the threshold a normal speed unload can be performed, but if the number of seeks exceeds the threshold an increased speed unload of the head 102 can be performed. The increased speed of the head 102 during unload can assure the pivot grease bump does not stall the unload of the head 102 before it reaches the head loading ramp 132.

In some embodiments, three unload types can be used retract the head 102 onto the head loading ramp 132. Normal unload is the main operation type for unloading the head 102, which is designed for best reliability and acoustic performance. It has longest life-time cycle requirement.

Emergency unload can be used in error recovery and free fall cases. It is designed for fast retraction of the head assembly 114 while power is still applied. Similarly, emergency power-off retract (EPOR) is a process to unload the head 102 that is performed in the event of an unplanned power loss. EPOR is fast and robust, and is driven by a hardware power device without a firmware control loop. Both emergency unload and EPOR cause the head 102 to suffer high velocity impact with the head loading ramp 132 and the outer diameter crash stop (ODCS) 134, which causes loud acoustics and short life-time cycle due to the stress of the high velocity impacts.

The table below summarizes characteristics of the unload types that can be utilized by the electronic system 100.

TABLE 1

HEAD UNLOAD CHARACTERISTICS

| Unload Types | Designed Ramp Touch Velocity (inch per second (ips)) | Active Brake (Lower velocity command before hitting ODCS for better acoustics and reliability) | ODCS Impact Velocity | Life Time Cycles Spec |
|---|---|---|---|---|
| Normal Unload | 5 | Yes | Low (~2 ips on mobile) | 300K Cycles |
| Emergency Unload | 16 | No | High (~13 ips on mobile) | 30K Cycles |
| EPOR | 17 | No | High (~15 ips on mobile) | 30K Cycles |

TABLE 2

UNLOAD SPEED AND TORQUE
EPOR Unload Torque and Pivot
Grease Bump Capability Analysis:

| | EPOR Target Velocity | Nominal Case Static Unload Torque | Nominal Case Dynamic GB Capability* |
|---|---|---|---|
| 5 media | 17 ips | 80 gmf-cm | 90 gmf-cm |
| 10 heads | 25 ips | 125 gmf-cm | 150 gmf-cm |
| 1 media | 17 ips | 22 gmf-cm | 53 gmf-cm |
| 1 head | 25 ips | 34 gmf-cm | 105 gmf-cm |

TABLE 3

EMERGENCY UNLOAD SPEED AND TORQUE
Emergency Unload Torque and Pivot
Grease Bump Capability Analysis:

| | Emergency Unload Target Velocity | Nominal Case Static Unload Torque | Nominal Case Dynamic GB Capability* |
|---|---|---|---|
| 5 media | 16 ips | 220 gmf-cm | 225 gmf-cm |
| 10 heads | 25 ips | 350 gmf-cm | 370 gmf-cm |
| 1 media | 16 ips | 56 gmf-cm | 64 gmf-cm |
| 1 head | 25 ips | 90 gmf-cm | 120 gmf-cm |

Due to the stress on the linkage between the fine positioner 113 and the head 102, concerns are raised about head-gimbal/suspension/air-bearing surface (ABS) stress and damage caused by executing high-speed unloads.

According to one of various embodiments, higher velocity unloads can be selectively executed to counteract the possible formation of the pivot grease bump. For example, if a drive has been actively operating without an unload/load cycle for an extended period of time, or a high number of seeks performed, such as 5-20 million seeks, according to one embodiment the control circuitry 138 can monitor the HAM control bus 120 to detect an increase in the current drawn by the head actuation motor 130 indicating something is impeding the progress of the head assembly 114. In order to determine whether the head assembly 114 has contacted the head loading ramp 132, the control circuitry 138 can check the offset voltage from the fine positioner 113. If the head assembly is in contact with the head loading ramp 132, an offset voltage increase will be caused by the deflection of the fine positioner 113. If no deflection is detected, indicated by the offset voltage being nominally zero, the control circuitry 138 can determine the pivot grease bump is the cause and can take corrective action, such as a boomerang seek, to overcome the pivot grease bump.

Figure 2:
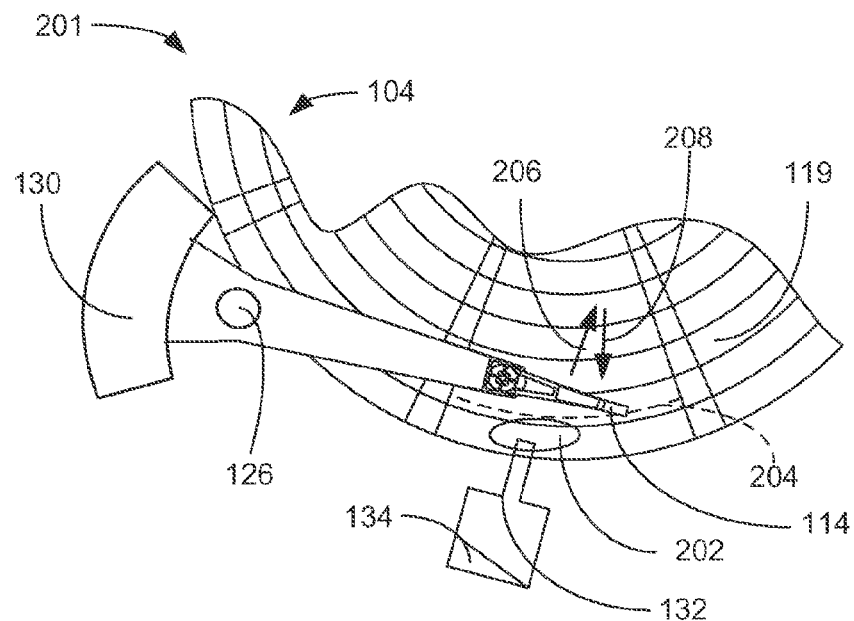
FIG. 2 shows a functional diagram of an exemplary segment of the head-disk interface.

Referring now to FIG. 2, therein is shown a functional diagram of an exemplary segment of the head-disk interface 201. The functional diagram of an exemplary segment of the head-disk interface 201 depicts the media 104 having a plurality of the data track 119. The head assembly 114 can be positioned by the head actuation motor 130 for accessing the data track 119.

After an extended period of operation, measured by operational time or the number of repositions of the head assembly 114, known as seeks, a wear pattern can be generated in the pivot bearing assembly 126. The wear pattern can cause the pivot grease bump, in the pivot bearing assembly 126, which can manifest a grease bump zone 202. The grease bump zone 202 can be an impairment to unloading the head assembly 114 from the media 104 and parking on the head loading ramp 132.

It is understood that the actual location of the pivot grease bump is in the pivot bearing assembly 126, but the resistance that the pivot grease bump asserts is only detected when the head assembly 114 enters the grease bump zone 202. During operational movement of the head assembly 114, an operational boundary 204 can be established on the media 104. The operational boundary 204 is the outermost extent to which the head assembly 114 is positioned during user operations. The grease bump zone 202 can be directly adjacent to the operational boundary 204. As the pivot bearing assembly 126 develops the wear pattern, grease is displaced from the range of motion of the head actuation motor 130. The grease can collect in a region of the pivot bearing assembly 126 that is reflected as the grease bump zone 202.

In some embodiments, firmware (FW) executed within the control circuitry 138 of FIG. 1A cannot differentiate between the grease bump zone 202 or the head loading ramp 132 during unload of the head assembly 114. This can cause the FW to misinterpret the rising current detected on the HAM control bus 120 of FIG. 1A due to the grease bump zone 202 as contact with the head loading ramp 132. If the misinterpretation is not exposed, the FW can apply a dynamic braking which can cause the head assembly 114 to park on the media 104 rather than on the head loading ramp 132. In order to prevent this catastrophic landing of the head assembly 114, other precautions must be put in place.

Some embodiments include methods to detect the presence of the pivot grease bump. In one embodiment, the control circuitry 138 can count the number of seeks performed from an initial loading of the head assembly 114 over the media 104. If the number of seeks exceeds a seek count threshold, the control circuitry 138 can assume the pivot grease bump is present in the pivot bearing assembly 126. The control circuitry 138 can utilize the emergency unload algorithm, with increased velocity of the head actuation motor 130 in order to move through the grease bump zone 202 and actually contact the head loading ramp 132 as required to safely unload the head assembly 114.

Other embodiments can allow the control circuitry to detect the increase in current in the HAM control bus 120. As a verification of what caused the increase in current, the control circuitry 138 can detect the offset voltage that is caused by deflection of the fine positioner 113 when it contacts the head loading ramp 132. However, the pivot grease bump does not create any significant offset voltage from the fine positioner 113 and can therefore be differentiated from the head assembly 114 contacting the head loading ramp 132.

When the pivot grease bump is detected, the control circuitry 138 can calculate the velocity of the head assembly 114 in order to use a boomerang seek as required to overcome the pivot grease bump. If the velocity of the head assembly 114 is below that of the normal unload, the boomerang seek must be utilized. The boomerang seek can be the combination of an inner diameter seek 206 and an outer diameter seek 208. By way of an example, the inner diameter seek 206 can move the head assembly 114 toward an inner diameter (ID) of the media 104 at 5 inches per second (IPS) for 20 ms, then the outer diameter seek 208 can move the head assembly 114 toward an outer diameter (OD) of the media 104 at 25 IPS until the head loading ramp 132 is detected. The boomerang seek can move the head assembly 114 away from the pivot grease bump, giving some runway to build up higher velocity of the head assembly 114 in preparation for hitting the pivot grease bump.

According to an embodiment, another method of detecting the pivot grease bump is for the control circuitry 138 to check the expected timing of the rise in the current detected on the HAM control bus 120. Since the beginning of the grease bump zone 202 can be as much as 10-50 times the width of the data track 119 an encounter with the pivot grease bump can be significantly earlier that the expected contact with the head loading ramp 132. This early detection of the increase in current can trigger the boomerang seek as well.

It has been discovered that the embodiments of the electronic system 100 of FIG. 1A can substantially prevent power-on unload failures due to the pivot grease bump. In any of the above cases the deflection of the fine positioner 113 by the head loading ramp 132 can create the offset voltage to be detected by the control circuitry 138 in order to trigger a dynamic braking of the head assembly 114 prior to impact with the outer diameter crash stop (ODCS) 134.

Figure 3:
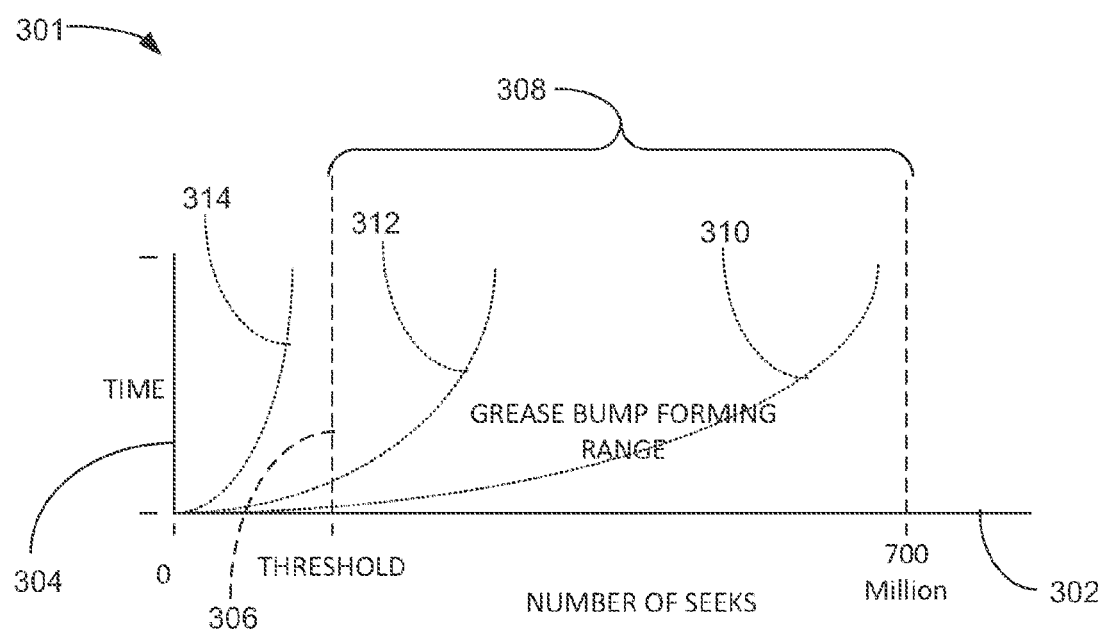
FIG. 3 shows a bar graph of a grease bump detection mechanism 301 according to an embodiment.

Referring now to FIG. 3, therein is shown a line graph of a grease bump detection mechanism 301 according to an embodiment. The formation of the pivot grease bump actually depends on a very wide range from a threshold, such as 0.1 million seeks, to 700 million for different embodiments. Several factors impact the formation of the pivot grease bump: HAM torque constant (Kt), unload velocity of the head assembly 114 of FIG. 1B, the preload of the pivot bearing assembly 126 of FIG. 1A, a race curvature, grease properties, ball/race hardness, tolerance ring, screw torque, etc. of the pivot bearing assembly 126.

The line graph of the grease bump detection mechanism 301 depicts an x-axis 302 that indicates the number of seeks performed by the electronic system 100 of FIG. 1A after loading the head assembly 114 over the media 104 of FIG. 1A. A y-axis 304 indicates the time elapsed between the loading the head assembly 114 over the media 104 and initiation of an unload of the head assembly 114.

When the head assembly 114 is initially loaded onto the media 104 of FIG. 1A a seek counter can be initialized to zero. As the number of seeks increases, the probability of forming the pivot grease bump also increases. If the number of seeks exceeds a seek count threshold 306, the unit will enter a grease bump forming range 308 indicating there is a high probability of having the pivot grease bump formed that can stall the unload of the head assembly 114.

By way of an example, a first plot 310 can have performed hundreds of millions of seeks and demonstrate a high probability of having formed the pivot grease bump. The control circuitry 138 of FIG. 1A can assume the presence of the pivot grease bump and utilize the emergency unload velocity for moving the head assembly 114 to the head loading ramp 132 of FIG. 1A. The increased velocity will assure that the head assembly 114 will have sufficient inertia to overcome the pivot grease bump.

A second plot 312 can exceed the seek count threshold 306 and be within the grease bump forming range 308. While there is less probability that the pivot grease bump has formed, the control circuitry 138 can assume the presence of the pivot grease bump and utilize the emergency unload velocity for moving the head assembly 114 to the head loading ramp 132. If no occurrence of the pivot grease bump is encountered, the head assembly 114 will unload onto the head loading ramp 132 as expected. When the control circuitry 138 detects the offset voltage on the HAM control bus 120 of FIG. 1A, caused by the fine positioner 113 contacting the head loading ramp 132, a dynamic braking can minimize the impact with the ODCS 134 of FIG. 1A.

A third plot 314 can be below the seek count threshold 306 and have a low probability that the pivot grease bump has formed. The control circuitry 138 will assume a normal unload velocity to unload the head assembly 114 from the media 104. If however the pivot grease bump has been formed, the control circuitry can rely on the detection of the offset voltage on the HAM control bus 120 to initiate the boomerang seek and identify the actual contact between the head assembly 114 and the head loading ramp 132.

Figure 4:
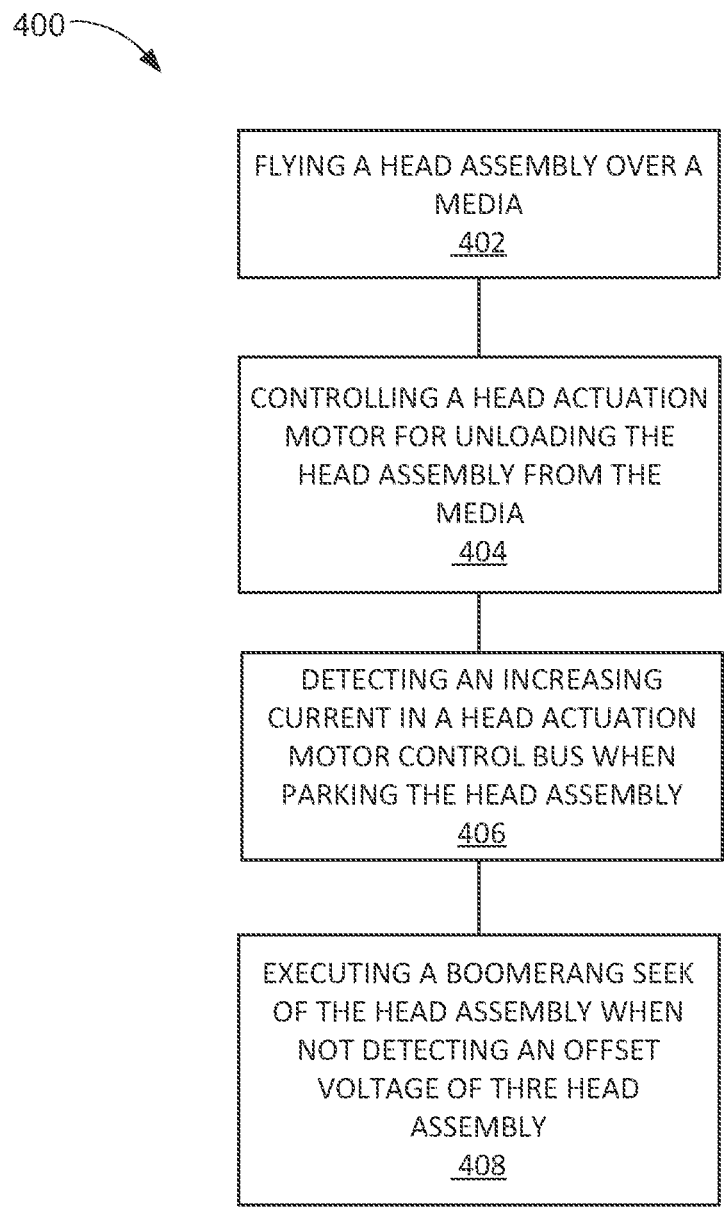
FIG. 4 shows a flowchart for unloading a head in the presence of a grease bump according to one embodiment.

Referring now to FIG. 4, therein is shown a flowchart of a method 400 of operation of an apparatus 100 for unloading a head assembly in the presence of a pivot grease bump according to one embodiment. For example, in one embodiment, the control circuitry can be configured for: flying a head assembly over a media in block 402; controlling a head actuation motor for unloading the head assembly from the media in block 404; detecting an increasing current in a head actuation motor control bus when parking the head assembly in block 406; and executing a boomerang seek of the head assembly when not detecting an offset voltage of the head assembly in block 408.

As previously shown in FIG. 1C above, the pivot grease bump can be predicted in one embodiment by counting the number of seeks that occur between unloads of the head assembly. If the number of seeks exceeds the seek count threshold, then the pivot grease bump is assumed to be present and an increased unload speed is utilized.

The above mentioned grease bump detection mechanisms may also be used to change one or more settings of an end of travel (EOT) detection mechanism for an EPOR unload process. Since EOT detection may rely on sampling Back EMF and HAM current to detect head contact with an ODCS, a grease bump may prematurely cause the sample thresholds to be exceeded and trigger EOT detection, stopping actuation before unload is completed. In one embodiment, based on the aforementioned seek counts/thresholds, the control circuitry can proactively adjust (1) an EOT setting (e.g., a setting to allow a HAM current to be applied longer at a saturated level), or (2) one or more (Proportional Integral) PI control coefficients for the EPOR, to improve the likelihood of an EPOR unload overcoming a grease bump if encountered.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment is that it valuably supports and services the historical trend of reducing costs, simplifying systems, and increasing performance.

These and other valuable aspects of an embodiment consequently further the state of the technology to at least the next level.

Some embodiments previously described have many aspects including but not limited to the following: The pivot grease bump detection or prediction algorithm can prevent the occurrence of the head-on-media (HOM) failure, which can damage the head, the media, or both. Some embodiments can resolve the pivot grease bump without impacting the performance of the electronic device or adding additional command latency.

HDD head actuation motor 130 of FIG. 1A can build up significant amount of the pivot grease bump over a long period of operation time. The pivot grease bump at the operational boundary 204 of FIG. 2 can exert larger resistance than available driving torque of the head actuation motor 130 during unload of the head assembly 114 of FIG. 1C. This can cause unload failure and leave the heads 102 of FIG. 1C on media 104 of FIG. 1A, which permanently damages the electronic system 100 of FIG. 1A.

It is understood that the pivot grease bump is actually formed in the pivot bearing assembly 126 of FIG. 1A, but the phenomena of the grease bump can stall the movement of the actuator arm 122 of FIG. 1A and the head actuation motor 130. If the pivot grease bump is not detected and overcome, the head 102 of FIG. 1B can land on the media 104 of FIG. 1A and the media motor 116 of FIG. 1A stopped. This condition can prevent the media motor 116 from spinning, damage the outer layer of the media 104, damage the head 102, or a combination thereof. Any of the damage caused by the pivot grease bump is permanent and unrecoverable.

While the various embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
a media;
a head assembly over the media;
a head actuation motor coupled to the head assembly;
control circuitry, coupled to the head actuation motor, configured to position the head assembly; and
a head loading ramp, adjacent to the media;
wherein the control circuitry is further configured to:
generate a seek count; and
park the head assembly, off of the media, on the head loading ramp, controlling a speed of the head actuation motor based on the seek count.

2. The apparatus as claimed in claim 1 wherein the control circuitry further configured to control the speed of the head actuation motor based on the seek count includes increasing the speed of the head actuation motor when the seek count exceeds a seek count threshold.

3. The apparatus as claimed in claim 1 wherein the control circuitry is further configured to control the head actuation motor by comparing the seek count to a seek count threshold.

4. The apparatus as claimed in claim 1 wherein the control circuitry is further configured to detect a current increase in a head actuation motor control caused by a pivot grease bump formed in a pivot bearing assembly of the head actuation motor.

5. The apparatus as claimed in claim 1 wherein the control circuitry is further configured to detect a current increase in a head actuation motor control bus.

6. The apparatus as claimed in claim 1 wherein the control circuitry is further configured to detect an offset voltage from the head assembly in contact with the head loading ramp.

7. The apparatus as claimed in claim 1 wherein the control circuitry is further configured to execute a boomerang seek of the head assembly if no offset voltage is detected from the head assembly.

8. The apparatus as claimed in claim 1 wherein the control circuitry is further configured to reset the seek count when the head assembly is parked on the head loading ramp.

9. The apparatus as claimed in claim 1 wherein the control circuitry is further configured to assume a grease bump is present if the seek count exceeds a seek count threshold.

10. The apparatus as claimed in claim 1 wherein the head assembly includes a fine positioner configured to provide an offset voltage when the head assembly is in contact with the head loading ramp.

11. The apparatus as claimed in claim 1 wherein the control circuitry is further configured to adjust an end of travel detection setting based on the seek count.

12. The apparatus as claimed in claim 1 wherein the control circuitry is further configured to adjust a proportional integral (PI) control coefficient based on the seek count.

13. A method of operating an apparatus, the method comprising:
 flying a head assembly over a media;
 controlling a head actuation motor for positioning the head assembly over the media;
 generating a seek count when positioning the head assembly; and
 parking the head assembly on a head loading ramp including controlling a speed of the head actuation motor based on the seek count.

14. The method as claimed in claim 13 wherein controlling the speed of the head actuation motor based on the seek count including increasing the speed of the head actuation motor when the seek count exceeds a seek count threshold.

15. The method as claimed in claim 13 wherein controlling the head actuation motor includes comparing the seek count to a seek count threshold.

16. The method as claimed in claim 13 further comprising detecting a current increase in a head actuation motor control bus caused by a pivot grease bump formed in a pivot bearing assembly of the head actuation motor.

17. The method as claimed in claim 13 further comprising detecting an increasing current in a head actuation motor control bus when parking the head assembly.

18. The method as claimed in claim 13 further comprising detecting an offset voltage from the head assembly in contact with the head loading ramp.

19. The method as claimed in claim 17 further comprising executing a boomerang seek of the head assembly when not detecting an offset voltage from the head assembly.

20. The method as claimed in claim 13 further comprising resetting the seek count after parking the head assembly.

21. The method as claimed in claim 13 further comprising assuming a grease bump is present includes the seek count exceeding a seek count threshold.

22. The method as claimed in claim 13 further comprising providing an offset voltage when a fine positioner of the head assembly is contacting the head loading ramp.

23. The method as claimed in claim 13 further comprising adjusting an end of travel detection setting based on the seek count.

24. The method as claimed in claim 13 further comprising adjusting a proportional integral (PI) control coefficient based on the seek count.

\* \* \* \* \*